United States Patent
Suzuki et al.

(10) Patent No.: US 9,550,496 B2
(45) Date of Patent: Jan. 24, 2017

(54) TRAVEL CONTROL APPARATUS

(71) Applicant: TOYOTA JIDOSHA KABUSHIKI KAISHA, Toyota-shi, Aichi (JP)

(72) Inventors: Ikuma Suzuki, Okazaki (JP); Masaki Matsunaga, Odawara (JP); Tetsuya Taira, Nisshin (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 15/131,149

(22) Filed: Apr. 18, 2016

(65) Prior Publication Data
US 2016/0318518 A1 Nov. 3, 2016

(30) Foreign Application Priority Data

Apr. 28, 2015 (JP) ................. 2015-091803

(51) Int. Cl.
| | |
|---|---|
| G05D 1/00 | (2006.01) |
| B60W 30/18 | (2012.01) |
| B60W 10/04 | (2006.01) |
| B60W 10/20 | (2006.01) |

(52) U.S. Cl.
CPC ........ B60W 30/18163 (2013.01); B60W 10/04 (2013.01); B60W 10/20 (2013.01); G05D 1/0088 (2013.01); B60W 2550/302 (2013.01); B60W 2550/308 (2013.01); B60W 2710/20 (2013.01); B60W 2720/10 (2013.01)

(58) Field of Classification Search
CPC B60W 30/18163; B60W 10/04; B60W 10/20; B60W 2550/308; B60W 2550/302; B60W 2720/10; B60W 2710/20; G05D 1/0088

See application file for complete search history.

(56) References Cited

U.S. PATENT DOCUMENTS

| | | | |
|---|---|---|---|
| 2010/0315217 A1 | 12/2010 | Miura et al. | |
| 2012/0265431 A1 | 10/2012 | Hayakawa et al. | |
| 2013/0184926 A1* | 7/2013 | Spero | B62D 1/28 701/26 |
| 2015/0375748 A1* | 12/2015 | Nagase | B60W 30/0953 701/41 |

FOREIGN PATENT DOCUMENTS

| | | |
|---|---|---|
| JP | 2010-287162 A | 12/2010 |
| JP | 2011-148483 A | 8/2011 |

* cited by examiner

*Primary Examiner* — Richard Camby
(74) *Attorney, Agent, or Firm* — Sughrue Mion, PLLC

(57) ABSTRACT

A travel control apparatus is configured to perform an overtaking travel on a host vehicle with a vehicle travelling ahead as an overtaking target vehicle during an autonomous driving of the host vehicle. In a case where the overtaking travel starts, the apparatus determines whether or not the overtaking target vehicle accelerates during the overtaking travel. In a case where it is determined that the overtaking target vehicle accelerates, the apparatus determines whether or not a front vehicle is present in front of the overtaking target vehicle. In a case where it is determined that the front vehicle is not present, the apparatus stops the overtaking travel of the host vehicle, and in a case where it is determined that the front vehicle is present, the apparatus continues the overtaking travel of the host vehicle under a predetermined condition.

2 Claims, 12 Drawing Sheets

TRAVEL CONTROL APPARATUS

TECHNICAL FIELD

The present invention relates to a travel control apparatus for a vehicle.

BACKGROUND

In the related art, for example, as disclosed in Japanese Unexamined Patent Publication No. 2010-287162, an apparatus is known, which detects another vehicle travelling in front of a host vehicle, detects an operation of the host vehicle overtaking another vehicle, and determines whether or not the overtaking operation is appropriate based on a positional relationship with respect to a lane in which the host vehicle travels during the overtaking operation. This apparatus determines whether the overtaking operation of the host vehicle is appropriate and performs a driving evaluation of the host vehicle.

Incidentally, in performing a travel control on a vehicle, performing a control of overtaking a preceding vehicle can be considered. In this case, the overtaking control is performed by detecting a travelling state of the preceding vehicle. However, in a case where the preceding vehicle accelerates after starting the overtaking operation, there is a problem in that it is not possible to appropriately overtake the preceding vehicle. For this reason, in a case where the preceding vehicle accelerates, it is considered that the overtaking control is stopped.

SUMMARY

However, if the overtaking control stops without an exception in a case where the preceding vehicle accelerates, the travelling of the vehicle cannot be performed smoothly. It is considered that there may be a case where, even if the preceding vehicle accelerates, the overtaking control can be appropriately performed depending on a travelling situation of surrounding vehicles.

Therefore, in the present technical field, it is desirable to develop a travel control apparatus that enables the vehicle to perform an appropriate overtaking travel according to the travelling situation of the surrounding vehicles.

That is, a travel control apparatus according to an aspect of the present invention is configured to perform an overtaking travel on a host vehicle with a vehicle travelling ahead as an overtaking target vehicle during autonomous driving of the host vehicle. The apparatus includes: a travelling state acquisition unit configured to acquire travelling state information of vehicles surrounding the host vehicle; an acceleration determination unit configured to determine whether or not the overtaking target vehicle accelerates at equal to or greater than a threshold value during the overtaking travel of the host vehicle based on the travelling state information; a front vehicle determination unit configured to determine where or not a front vehicle travelling in front of the overtaking target vehicle is present based on the travelling state information in a case where the acceleration determination unit determines that the overtaking target vehicle accelerates at equal to or greater than the threshold value during the overtaking travel of the host vehicle; and a travel control unit configured to stop the overtaking travel of the host vehicle in a case where the front vehicle determination unit determines that the front vehicle is not present, and to continue the overtaking travel of the host vehicle under a predetermined condition in a case Where the front vehicle determination unit determines that the front vehicle is present.

According to this travel control apparatus, in a case where the overtaking target vehicle accelerates during the overtaking travel of the host vehicle and when the front vehicle is not present, the overtaking travel of the host vehicle stops. In this way, in a case where there is a concern that overtaking the overtaking target vehicle cannot be smoothly performed, the overtaking travel stops. Therefore, it is possible to ensure the safety n travelling of the vehicle. On the other hand, even when the overtaking target vehicle accelerates during the overtaking travel of the host vehicle, in a case where the front vehicle is present, the overtaking travel of the host vehicle continues. In this way, in a case where there is a possibility that the accelerated overtaking target vehicle decelerates after the acceleration, the overtaking travel can be continued and thus, it is possible to perform appropriate overtaking travel in accordance with the travelling state of the surrounding vehicles.

In addition, the travel control apparatus may further include an estimation unit configured to estimate whether or not the overtaking target vehicle decelerates due to the presence of the front vehicle in a case where the front vehicle determination unit determines that the front vehicle travelling in front of the overtaking target vehicle is present. In a case where the estimation unit estimates that the overtaking target vehicle does not decelerate, the travel control unit may stop the overtaking travel of the host vehicle. In a case where the estimation unit estimates that the overtaking target vehicle decelerates, the travel control unit may continue the overtaking travel, of the host vehicle.

In this case, even in a case were the overtaking target vehicle accelerates at equal to or greater than the threshold value during the overtaking travel of the host vehicle and the front vehicle travelling in front of the overtaking target vehicle is present, in a case where it is estimated that the overtaking target vehicle does not decelerate, the overtaking travel of the host vehicle stops. In this way, an excessive overtaking travel of the host vehicle can be suppressed, and thus, it is possible to ensure the safety of the vehicle travel.

According to the present invention, in performing the travel control on the vehicle, it is possible to perform an appropriate overtaking travel according to the travelling situations of the surrounding vehicles.

DETAILED DESCRIPTION

Hereinafter, embodiments of the present invention will be described with reference to the drawings. In the description below, the same reference signs will be given to the same or similar elements and the descriptions thereof will not be repeated.

Figure 1:
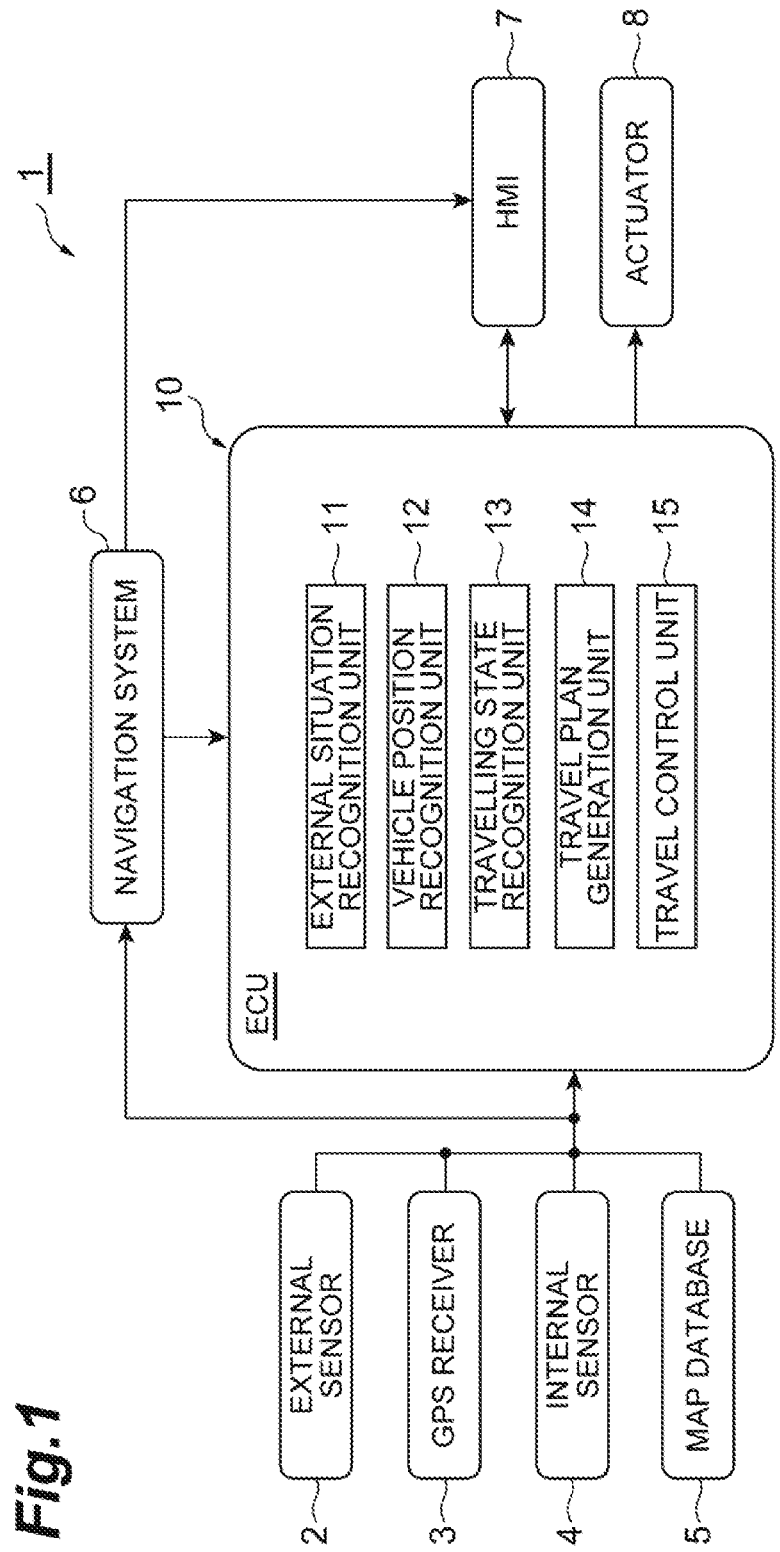
FIG. 1 is a block diagram illustrating a configuration overview of a travel control apparatus in an embodiment of the present invention.

FIG. 1 is a block diagram illustrating a configuration overview of a travel control apparatus 1 in an embodiment of the present invention. In FIG. 1, the travel control apparatus 1 is an apparatus mounted on a host vehicle and performs a travel control of the host vehicle, and is an apparatus that enables the host vehicle to perform an overtaking travel control during an autonomous driving of the host vehicle with the preceding vehicle travelling ahead as an overtaking target vehicle.

Here, the autonomous driving means a driving of a vehicle by the apparatus being as a main operator. The autonomous driving may be a fully autonomous driving in which the occupant of the vehicle is not involved in the driving or may be a driving by a driving assist control in which the driving is performed by the apparatus being as a main operator with receiving a support from the occupant of the vehicle. In addition, the preceding vehicle may be a closest vehicle in front of the host vehicle or, in a case where the closest vehicle in front of the host vehicle is travelling with vehicles that further travel in front of the vehicle in a row, the preceding vehicle may be a leading vehicle of the plurality of vehicles travelling in a row. The overtaking travel means a travelling of changing the lane, passing the preceding vehicle, and then, returning to the original lane by changing the lane again.

The travel control apparatus 1 includes an electronic control unit (ECU) 10. The ECU 10 is an electronic control unit for performing a travel control of a vehicle and is formed of mainly as a computer including a central processing unit (CPU), a read only memory (ROM), and a random access memory (RAM). Details of the ECU 10 will be described below.

An external sensor 2, a global positioning system (GPS) receiver 3, an internal sensor 4, a map database 5, a navigation system 6, a human machine interface (HMI) 7 and an actuator 8 are respectively connected to the ECU 10.

The external sensor 2 is a detection device that detects an external situation which is surroundings information of the host vehicle. The external sensor 2 includes at least one of a camera, radar, and a laser imaging detection and ranging (LIDAR). The camera is an imaging device that images the external situation of the vehicle.

The camera as the external sensor 2 functions as a detection unit that detects vehicles around the host vehicle. Including a preceding vehicle travelling in front of the host vehicle, a vehicle in front of the preceding vehicle may be detected as the detects vehicles around the host vehicle. In addition, if there is an adjacent lane, a vehicle in the adjacent lane may be detected. In addition, the camera can be used as a detection unit that detects lane markers provided on the right and left side of the lane in which the host vehicle travels. The image information of the camera is transmitted to the ECU 10.

The camera is, for example, provided on the inside of windshield of the vehicle. The camera may be a monocular camera or may be a stereo camera. The stereo camera has two imaging units that are arranged so as to reproduce a binocular parallax. The image information from the stereo camera includes information of the depth direction. In a case where the stereo camera is used, the camera can be used as a detection unit that detects surrounding vehicles including a preceding vehicle and an object including an obstacle.

The radar detects surrounding vehicles and an obstacle using a radio wave (for example, a millimeter wave). The radar detects the obstacle by transmitting the radio wave to the surroundings of the vehicle and receiving the wave reflected from the obstacle. The radar transmits the detected obstacle information to the ECU 10. In a case where a sensor fusion is performed in the subsequent stage, it is preferable to transmit the received information of the radio wave to the ECU 10.

The LIDAR detects surrounding vehicles and an obstacle using light. The LIDAR transmits the light to the surroundings of the vehicle, measures the distance to the reflection point by receiving the light reflected from the obstacle, and then, detects the surrounding vehicles and the obstacle. The LIDAR transmits the detected obstacle information, to the ECU 10. In a case where a sensor fusion is performed in the subsequent stage, it is preferable to transmit the received information of the reflected light to the ECU 10. The camera, the LIDAR, and the radar are not necessarily prepared in an overlapping manner.

The GPS receiver 3 receives signals from three or more GPS satellites and measures the position of the host vehicle (for example, the latitude and longitude of the vehicle). The UPS receiver 3 transmits the measured position information of the vehicle to the ECU 10. Instead of the GPS receiver 3, another means for specifying the latitude and the longitude of the vehicle may be used. In addition, it is preferable for the OPS receiver 3 to have a function of measuring the orientation of the vehicle in order to collate the result of measuring by the sensors and map information described below.

The internal sensor 4 is a detection device that detects the travelling state of a vehicle. The internal sensor 4 includes at least one of a vehicle speed sensor, an acceleration sensor, and a yaw rate sensor. The vehicle speed sensor is a detection device that detects a speed of the host vehicle. As the vehicle speed sensor, for example, a wheel speed sensor is used, which is provided on vehicle wheels of the host vehicle or a member such as a drive shaft rotating integrally or synchronized to the vehicle wheels and detects a rotational speed of the vehicle wheels. The vehicle speed sensor transmits the detected vehicle speed information (vehicle wheel speed information) to the ECU 10.

The acceleration sensor is a detection device that detects an acceleration of the vehicle. The acceleration sensor includes, for example, a longitudinal acceleration sensor that detects acceleration in the longitudinal direction of the vehicle and a lateral acceleration sensor that detects a lateral acceleration of the vehicle. The acceleration sensor transmits, for example, the acceleration information of the vehicle to the ECU 10. The yaw rate sensor is a detection device of the vehicle that detects a yaw rate around the vertical axis of the center of gravity of the vehicle (rotational angular velocity). As the yaw rate sensor, for example, a gyro sensor can be used. The yaw rate sensor transmits the detected yaw rate information of the vehicle to the ECU 10.

The map database 5 is a database in which map information is included. The map database is formed, for example, in a hard disk drive (HDD) mounted on the vehicle. In the map information, for example, position information of roads, information on road types (for example, types of straight portion and a curved portion, a curvature of the curve), and information of the number of lanes of the road are included. Furthermore, in order to use the position information of a shielding structure such as a building or a wall and the simultaneous localization and mapping technology (SLAM), it is preferable that the map information include an output signal of the external sensor 2. The map database may be stored in a computer in the facility such as an information processing center which is capable of communicating with vehicle.

The navigation system 6 is a device configured to perform guidance to a destination set by a driver of the vehicle for a driver of the vehicle. The navigation system 6 calculates a travelling route of a vehicle based on the position information of the vehicle measured by the GPS receiver 3 and the map information in the map database 5. The route may be a route on which a preferable lane is specified in the road section of multi-lane. The navigation system 6 calculates, for example, a target route from the position of the vehicle to the destination and performs notification on the driver of the target route by displaying on a display or a voice output through a speaker. The navigation system 6, for example, transmits the target route information of the vehicle to the ECU 10. The navigation system 6 may be stored in a computer in the facility such as an information processing center which is capable of communicating with the vehicle.

The HMI 7 is an interface that performs an input and output of the information between an occupants (including the driver) and the travel control apparatus 1. The HMI 7 includes, for example, a display panel for displaying the image information for the driver, a speaker for audio output, and an operation button or a touch panel for the driver to perform the input operation. For example, when an input operation for starting or stopping the automatic driving control or the travel control is performed by the occupant, the HMI 7 outputs a signal to the ECU 10, and start or stops the automatic driving control or the travel control. When the vehicle arrives at the destination where the automatic driving control or the travel control ends, the HMI 7 notifies the occupants of the arrival at the destination. The HMI 7 may perform the outputting of the information using a wirelessly connected mobile information terminal or may receive input operation of the occupant using the mobile information terminal.

The actuator 8 is a device that executes an automatic driving control including the travel control of the vehicle. The actuator 8 includes at least a throttle actuator, a brake actuator, and a steering actuator. The throttle actuator controls a supply amount (throttle opening degree) of air to an engine according to the control signal from the ECU 10, and controls the driving power of the vehicle. In a case where the vehicle is a hybrid vehicle or an electric vehicle, the driving power is controlled by the control signal from the ECU 10 being input to a motor which, is a source of the driving force.

The brake actuator controls a brake system according to the control signal from the ECU 10 and controls the braking power given to the wheels of the vehicle. For example, a hydraulic brake system can be used as the brake system. The steering actuator controls the driving of an assist motor that controls steering torque in the electric power steering system according to the control signal from the ECU 10. In this way, the steering actuator controls the steering torque of the vehicle.

The ECU 10 includes an external situation recognition unit 11, a vehicle position recognition unit 12, a travelling state recognition unit 13, a travel plan generation unit 14, and a travel control unit 15.

The external situation recognition unit 11 recognizes external situations of the vehicle based on the detection result (for example, image information from the camera, obstacle information from the radar, obstacle information from the LIDAR) of the external sensor 2. The external situation includes, for example, a vehicle situation (a position and a speed of the surrounding vehicles) surrounding the host vehicle, a shape of the road (for example, a curvature of the travelling lane, a gradient change effective for estimating the prospects of the external sensor 2, an undulation), and a situation of obstacles surrounding the vehicle (for example, information for distinguishing a fixed obstacle and a moving obstacle, a position of the obstacle with respect to the vehicle, a moving direction of the obstacle with respect to the vehicle, a relative speed of the obstacle with respect to the vehicle, and the like), in addition, accuracies of the position and the direction of the host vehicle acquired from the UPS receiver 3 or the like may be supplemented by collating the result of the detection by the external sensor 2 and the map information. The external situation recognition unit 11 functions as a travelling state acquisition unit that acquires the travelling state information of the vehicle surrounding the host vehicle.

The vehicle position recognition unit 12 recognizes the position of the vehicle (hereinafter, referred to as "vehicle position") on the map based on the position information of the vehicle received by the UPS receiver 3 and the map information in the map database 5. The vehicle position recognition unit 12 may recognize the vehicle position by acquiring the vehicle position used in the navigation system 6 from the navigation system 6. In a case where the vehicle position of the host vehicle is measured by a sensor installed at the outside of the vehicle such as on the road, the vehicle position recognition unit 12 may acquire the vehicle position from the sensor by a communication.

The travelling state recognition unit 13 recognizes the travelling state of the host vehicle based on the detection result of the internal sensor 4 (for example, the vehicle speed information from the vehicle sensor, the acceleration information from the acceleration sensor, the yaw rate information from the yaw rate sensor). For example, vehicle speed, acceleration, yaw rate of the vehicle are included in the travelling state of the vehicle. In addition, the travelling state recognition unit 13 may recognize the travelling direction of the vehicle based on a temporal change in the position of the vehicle.

The travel plan generation unit 14 is a unit that generates the travel plan of the vehicle, and for example, generates a target travel route of the vehicle based on the target route calculated by the navigation system 6, the vehicle position recognized by the vehicle position recognition unit 12, and the external situation (including the vehicle position and the direction) of the vehicle recognized by the external situation recognition unit 11.

The travel plan generation unit 14 generates the travel path such that the host vehicle travels along the lane. In addition, in a case where the host vehicle performs the overtaking of the preceding vehicle, the travel plan generation unit 14 generates a travel path for the overtaking travel according to the presence or absence of the surrounding vehicles or the travelling state of the surrounding vehicles. Here, at the time of performing the overtaking travel, the travel plan generation unit 14 functions as a front vehicle determination unit that determines whether or not a front vehicle which travels in front of the overtaking target vehicle is present. The determination of the presence or absence of the front vehicle may be performed using travelling state information of the surrounding vehicles from the external situation recognition unit 11. In principle, the overtaking target vehicle is a vehicle that precedes the host vehicle. In addition, in a case where the preceding vehicle is travelling with vehicles that travel in front of the preceding vehicle in a row, a leading vehicle of the plurality of vehicles travelling in a row may be an overtaking target vehicle. The overtaking travel of the host vehicle may start by an overtaking travel instruction from the occupant of the host vehicle, or may automatically start according to the travelling situation of the surrounding vehicles including the preceding vehicle.

The travel plan generation unit 14 functions as an acceleration determination unit that determines whether or not the overtaking target vehicle accelerates at equal to or greater than a threshold value during the overtaking travel of the host vehicle based on the travelling state information of the surrounding vehicles from the external situation recognition unit 11, "During the overtaking travel" means that the host vehicle is performing the overtaking travel, and includes the travel from the starting of the overtaking travel to the ending of the overtaking travel. For example, "during the overtaking travel." may be a travelling state before changing the lane when the host vehicle travels behind the overtaking target vehicle, may be a travelling state during the lane change, may be a state in which the host vehicle changes the lane and travels in a lane adjacent to the overtaking target vehicle's lane, or may be a state after overtaking the overtaking target vehicle. An acceleration value set in the ECU 10 in advance may be used as the threshold value of the acceleration of the overtaking target vehicle. The acceleration of the overtaking target vehicle includes acceleration in order to interfere with the overtaking travel of the host vehicle.

The travel plan generation unit 14 functions as an estimation unit that estimates, in a case where the overtaking target vehicle accelerates at equal to or greater than the threshold value during the overtaking travel of the host vehicle and a front vehicle is determined to be present in front of the overtaking target vehicle, estimates whether or not the overtaking target vehicle decelerates due to the presence of the front vehicle. For example, in a case where the overtaking target vehicle accelerates at equal to or greater than the threshold value during the overtaking travel of the host vehicle and the front vehicle is determined to be present in front of the overtaking target vehicle, the travel plan generation unit 14 estimates whether or not the overtaking target vehicle decelerates based on a relative distance and a relative speed between the front vehicle and the overtaking target vehicle. Specifically, in a case where a vehicle speed of the front vehicle is higher than a vehicle speed of the overtaking target vehicle, it is estimated that the overtaking target vehicle does not decelerate. Even in a case where the vehicle speed of the overtaking target vehicle is higher than the vehicle speed of the front vehicle, in a case where the distance between the front vehicle and the overtaking target vehicle is long and in a case where the overtaking target vehicle does not decelerate until the host vehicle passes the overtaking target vehicle, it is estimated, that the overtaking target vehicle does not decelerate.

In a case where the host vehicle does not perform the overtaking travel, the travel plan generation unit 14 performs the generation of a path in which no overtaking is performed. For example, in a case where a preceding vehicle is not present and the overtaking travel is not performed, a path causing the host vehicle to travel along the current lane is generated. In addition, in a case where the preceding vehicle is present and the preceding vehicle accelerates after the overtaking travel, and thereafter, it is estimated that the preceding vehicle does not decelerate, a path in which no overtaking is performed is generated. At this time, the host vehicle may be caused to travel in a decelerating manner. On the other hand, in a case where the preceding vehicle does not accelerate after the starting of the overtaking travel to overtake the preceding vehicle, a generation of a first overtaking path for overtaking the preceding vehicle is performed. The first overtaking path is an overtaking path in which the preceding vehicle immediately in front of the host vehicle is the overtaking target vehicle, and, for example, is a path in which a lane change is performed in such a manner that the host vehicle changes the lane, passes the preceding vehicle, and then, returns to the original lane in front of the preceding vehicle. In addition, in a case where it is estimated that the preceding vehicle accelerates after starting the overtaking travel in order to overtake the preceding vehicle, and decelerates thereafter, a generation of a second overtaking path for overtaking a vehicle traveling in front of the preceding vehicle is performed. The second overtaking path is an overtaking path in which a front vehicle that travels in front of the preceding vehicle which precedes the host vehicle is the overtaking target vehicle, and for example, is a path in which a lane change is performed in such a manner that the host vehicle changes the lane, passes the front vehicle that travels in front of the preceding vehicle, and then, returns to the original lane in front of the front vehicle.

In a case where it is determined that the overtaking target vehicle accelerates at equal to or greater than the threshold value during the overtaking travel of the host vehicle, when it is determined that the front vehicle is not present in front of the overtaking target vehicle, the travel plan generation unit 14 may generate a path causing the host vehicle to stop the overtaking travel and not to perform the overtaking travel, and when it is determined that the front vehicle is present, may generate the second overtaking path causing the host vehicle to continue to perform the overtaking travel. In this case, a second overtaking causing the host vehicle to continue performing the overtaking travel under a predetermined condition may be generated. Here, the predetermined condition is a case where, for example, the overtaking target vehicle decelerates due to the presence of the front vehicle. Details of the generation of the path described above will be described below.

The target travel route is a trajectory of the vehicle on the target route. The travel plan generation unit 14 generates the travel plan such that the vehicle can travel while satisfying standards such as safety, regulatory compliance, and driving efficiency on the target route. Here, it is needless to say the travel plan generation unit 14 generates the target trajectory of the vehicle so as to avoid a contact with obstacles based on the situation of the obstacles around the vehicle.

The target route described here also includes a travel route generated based on the external situation or the map information, when a destination is not clearly set by a driver as a travel route along the road in the "driving assistance device" disclosed in Japanese Patent No. 5382218

(WO2011/158347) or the "driving assistance device" disclosed in Japanese Unexamined Application Publication No. 2011-162132.

The travel plan generation unit 14 generates the travel plan according to the generated route. That is, the travel plan generation unit 14 generates the travel plan along the target route set at least based on the external situation which is the information surrounding the vehicle and the map information in the map database 5. It is preferable for the travel plan generation unit 14 to output the generated travel plan as a plan having a combination of two elements of a target position p on a coordinate system on which the path of the vehicle is fixed and a target speed at each target position, that is, a plurality of configuration coordinates (p, v). Here, each target position p has at least information of the x and y coordinates on the coordinate system fixed on the vehicle or information equivalent thereto. The travel plan is not particularly limited as long as it indicates the behavior of the vehicle. A target time t, for example, may be used in the travel plan instead of the target speed v, or a travel plan in which the target time t and the orientation of the vehicle at that time are added may be used.

In addition, usually, it is sufficient that the travel plan is data of roughly a few seconds from the current time, and sometimes a data of several tens of seconds is needed depending on the situation, such as a right turn at the intersection or the overtaking of the vehicle. Therefore, it is preferable that the number of configuration coordinates of the travel plan is variable and a distance between the configuration coordinates is also variable. Furthermore, a curve connecting the configuration coordinates may be approximated by a spline function or the like, and then, the parameters of the curve may be used as the travel plan. Any arbitrary known method can be used for the generation of the travel plan as long as the behavior of the vehicle can be indicated.

The travel plan may be data indicating a trends of the vehicle speed, the acceleration and deceleration, and the steering torque of the vehicle when the vehicle travels on the path along the target route. The travel plan may include a speed pattern, an acceleration or deceleration pattern, and a steering torque pattern of the vehicle. Here, the travel plan generation unit 14 may generate the travel plan such that the travel time (a time required for the vehicle to arrive at the destination) becomes shortest.

Incidentally, for example, the target speed pattern is data formed from a target vehicle speed set in association with the time for each target control position with respect to the target control position set on the path in a predetermined interval (for example, one meter). The target acceleration pattern or deceleration pattern is, for example, data formed from the target acceleration or deceleration set in association with the time for each target control position with respect to the target control position set on the path in a predetermined interval (for example, one meter). The target steering pattern is, for example, data formed from the target steering set in association with the time for each target control position with respect to the target control position set on the path in a predetermined interval (for example, one meter).

The travel control unit 15 automatically controls the travelling of the vehicle based on the travel plan generated by the travel plan generation unit 14. The travel control unit 15 outputs the control signal in response to the travel plan to the actuator 8. In this way, the travel control unit 15 controls the travelling of the vehicle such that the vehicle autonomously travels in accordance with the travel plan.

For example, in a case where the travel plan generation unit 14 determines that the overtaking target vehicle accelerates at equal to or greater than the threshold value during the overtaking travel of the host vehicle, the travel control unit 15 stops the overtaking travel of the host vehicle when the front vehicle travelling in front of the overtaking target vehicle is not present, and continues the overtaking travel of the host vehicle when the front vehicle is present. In addition, when the host vehicle performs the overtaking travel, in a case where the travel plan generation unit 14 estimates that the overtaking target vehicle decelerates, the travel control unit 15 continues the overtaking travel of the host vehicle. On the other hand, in a case where the travel plan generation unit 14 determines that the front vehicle is not present and in a case where the travel plan generation unit 14 estimates that the overtaking target vehicle does not decelerates, the travel control unit 15

The external situation recognition unit 11, the vehicle position recognition unit 12, the travelling state recognition unit 13, the travel plan generation unit 14, and the travel control unit 15 described above may be configured by introducing software or programs that realizes the respective functions to the ECU 10. In addition, a part or all of the above units may be respectively configured by individual electronic control units.

Next, an operation of the travel control apparatus 1 in the present embodiment will be described.

Figure 2:
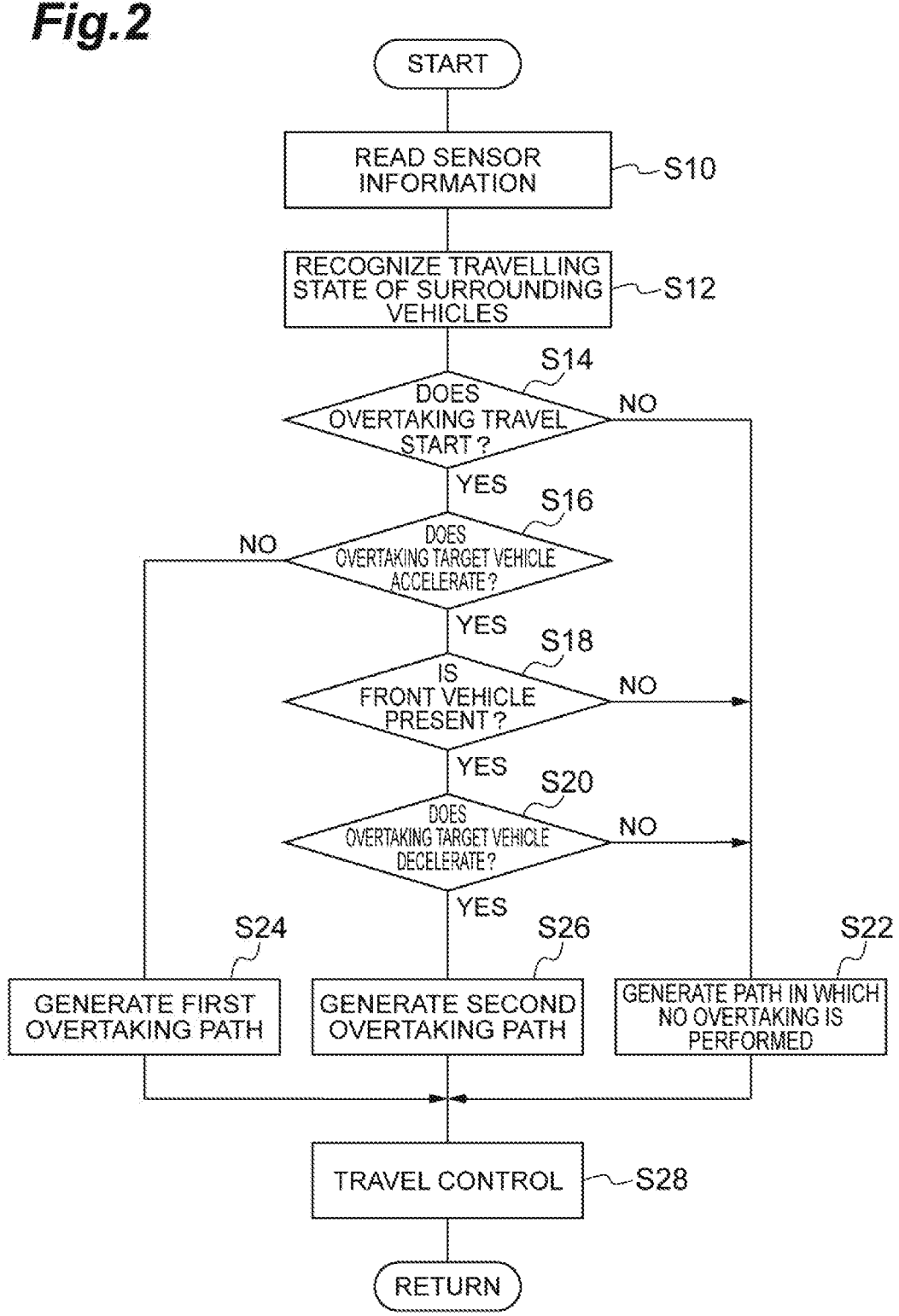
FIG. 2 is a flowchart illustrating travel control processing in the travel control apparatus in FIG. 1.

FIG. 2 is a flowchart illustrating travel control processing in the travel control apparatus 1 in the present embodiment. The travel control processing in FIG. 2 is performed, for example, when an autonomous travel control of the host vehicle is executed and starts with the starting of the autonomous travel control. In addition, this travel control processing is performed by, for example, the ECU 10, and is repeatedly executed in a predetermined period.

As illustrated in S10 in FIG. 2, firstly, processing of reading the sensor information is performed. This processing is processing of reading the information from the external sensor 2, the GPS receiver 3, the internal sensor 4, and the navigation system 6. For example, at least the position information and the vehicle speed information of the vehicles surrounding the host vehicle are read as the sensor information from the external sensor 2. In addition, the position information of the host vehicle is read as the sensor information from the GPS receiver 3. In addition, at least the vehicle speed information is read as the sensor information from the internal sensor 4. In addition, at least the position information of the host vehicle on the road data or on the map is read as the information from the navigation system 6.

Then, the process proceeds to S12 and processing of recognizing the travelling state of the surrounding vehicles is performed. This travelling state recognition processing is processing for recognizing the travelling state of the vehicles surrounding the host vehicle, and is performed by, for example, the external situation recognition unit 11. Specifically, the presence or absence of the preceding vehicle travelling immediately in front of the host vehicle, the relative distance and the relative speed to the preceding vehicle, the presence or absence of the vehicle travelling in front of the preceding vehicle, the relative distance and the relative speed to that vehicle, and the like are recognized. In addition, in a case where there is a lane adjacent to the lane in which the host vehicle travels, the travelling situation of a vehicle in the adjacent lane may be recognized.

Figure 3:
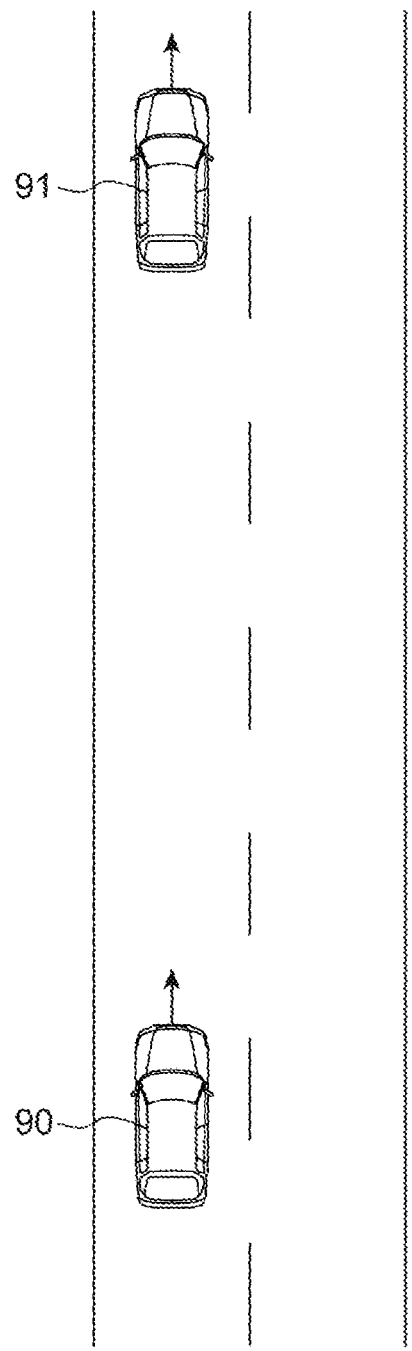
FIG. 3 is a diagram for describing a vehicle travelling state in the travel control apparatus in FIG. 1.

Then, the process proceeds to S14 and it is determined whether or not the overtaking travel of the host vehicle starts. This determination processing is processing for determining whether or not the overtaking travel starts as travel control of the host vehicle, and is performed by, for example, the travel plan generation unit 14. The overtaking travel of the host vehicle starts by an operation of overtaking travel instruction from the occupant of the host vehicle. In addition, as a part of the autonomous driving control, the overtaking travel of the host vehicle may automatically start according to the travelling situation of the surrounding vehicles including the preceding vehicle. Specifically, in a case where the preceding vehicle is not present in front of the host vehicle, the overtaking travel does not start. In addition, as illustrated in FIG. 3, even in a case where a preceding vehicle 91 is present in front of a host vehicle 90, when a distance to the preceding vehicle 91 is sufficiently long, the overtaking travel does not starts. On the other hand, in a case where a vehicle speed of the host vehicle 90 is higher than a vehicle speed of the preceding vehicle 91 and the distance from the host vehicle 90 to the preceding vehicle 91 is equal to or shorter than a predetermined distance, the overtaking travel starts.

In a case where it is determined that the overtaking travel of the host vehicle does not start in S14 in FIG. 2, the generation of the path is performed, in which no overtaking is performed (S22). In the processing of generating the path in this case, a path causing the host vehicle to travel along the lane in which the host vehicle travels. As a specific method of generating the path, an arbitrary known method can be used.

On the other hand, in a case where it is determined that the overtaking travel of the host vehicle starts in S14, it is determined whether or not the overtaking target vehicle accelerates at equal to or greater than the threshold value during the overtaking travel (S16). This determination processing is processing for determining whether or not the host vehicle starts the overtaking travel and the overtaking target vehicle accelerates at equal to or greater than the threshold value during the overtaking travel. "During the overtaking travel" includes the travelling state from the starting of the overtaking travel to the ending of the overtaking travel. For example, "during the overtaking travel" may be a travelling state before changing the lane when the host vehicle travels behind the overtaking target vehicle, may be a travelling state during the lane change, may be a state in which the host vehicle changes the lane and travels in a lane adjacent to the overtaking target vehicle's lane, or may be a state after passing the overtaking target vehicle. The preceding vehicle travelling immediately in front of the host vehicle is set as the overtaking target vehicle. However, in a case where vehicles are travelling in front of the preceding vehicle in a row, a leading vehicle of the plurality of vehicles travelling in a row may be set as an overtaking target vehicle. The determination whether or not the vehicles travel in a row may be performed based on, for example, whether or not the host vehicle passes the preceding vehicle or the like, and thereafter, there is a sufficient vehicle-to-vehicle space for the host vehicle to return to the original lane in front of the preceding vehicle. That is, in a case where there is no sufficient vehicle-to-vehicle space for the host vehicle to return to the original lane, it may be determined that the vehicles travel in a row. The acceleration value set in advance in the ECU 10 may be used as the threshold value of the acceleration.

Figure 4:
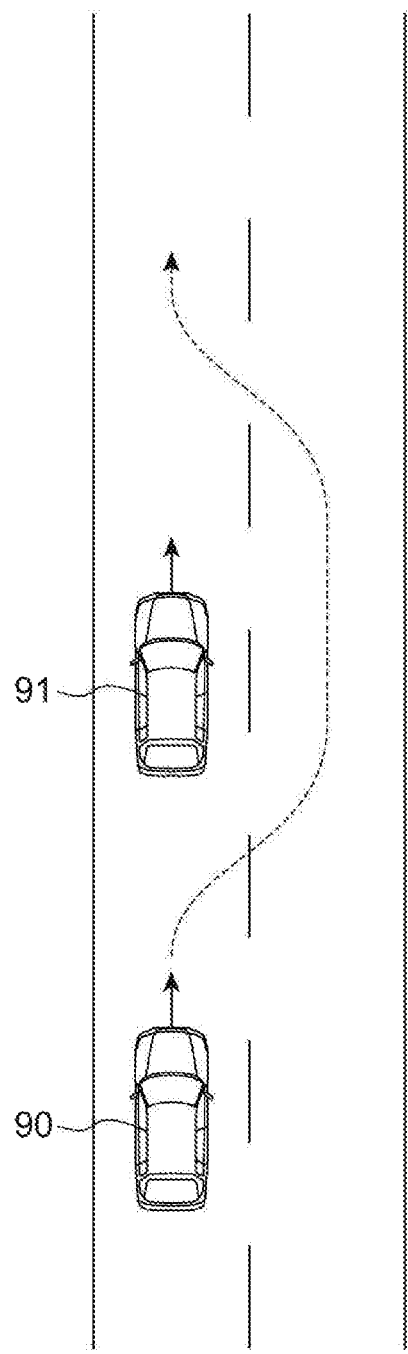
FIG. 4 is a diagram for describing path generation processing in the travel control apparatus in FIG. 1.

In a case where it is determined in S16 that the overtaking target vehicle does not accelerate at equal to or greater than the threshold value during the overtaking travel, the first overtaking path is generated (S24). This generation processing is processing of generating the first overtaking path which is an ordinary overtaking path, and generating the first overtaking path in which the lane change is performed and the host vehicle passes the preceding vehicle, and then, returns to the original lane in front of the preceding vehicle. For example, as illustrated in FIG. 4, in a case where the host vehicle 90 travels behind the preceding vehicle 91 which is the overtaking target vehicle, the travel path (a dashed line in FIG. 4) is generated in such a manner that the host vehicle 90 changes the lane, passes the preceding vehicle 91, and then, returns to the original lane in front of the preceding vehicle 91.

Figure 5:
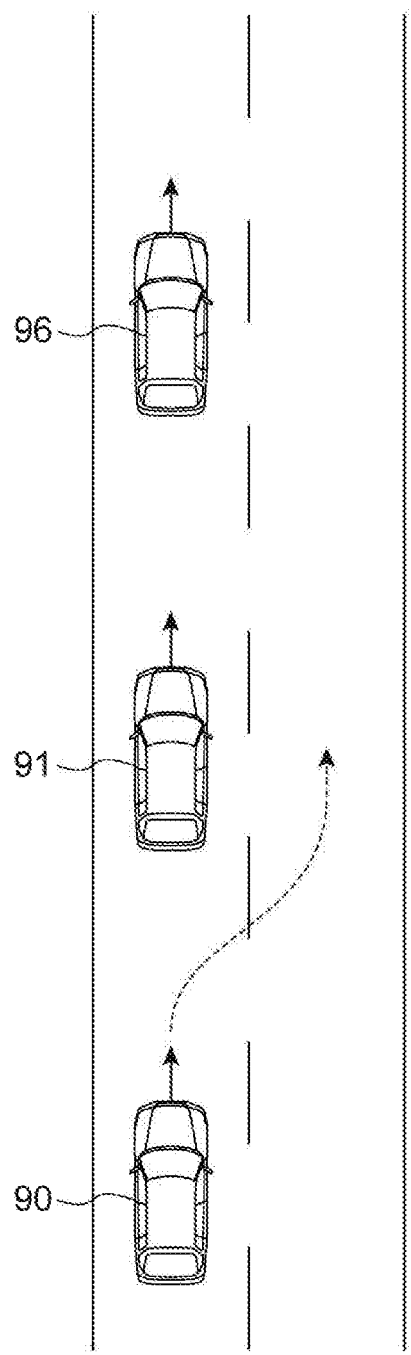
FIG. 5 is a diagram for describing path generation processing in the travel control apparatus in FIG. 1.

On the other hand, in a case where it is determined in S16 in FIG. 2 that the overtaking target vehicle accelerates at equal to or greater than the threshold value during the overtaking travel, it is determined whether or not the front vehicle is present in front of the overtaking target vehicle (S18). This determination processing is processing for determining whether or not the front vehicle is present within a predetermined distance in front of the overtaking target vehicle. A distance value set in advance in the ECU 10 may be used as the predetermined distance. For example, as illustrated in FIG. 5, in a case where a vehicle is present within the predetermined distance in front of the preceding vehicle 91 which is the overtaking target vehicle, it is determines that a front vehicle 96 is present. On the other hand, as illustrated in FIG. 6, in a case where it is determined that a vehicle is not present within the predetermined distance in front of the preceding vehicle 91, it is determined that the front vehicle 96 is not present.

In a case where it is determined in S18 in FIG. 2 that the front vehicle is not present in front of the overtaking target vehicle, the generation of the path is performed, in which the overtaking travel of the host vehicle stops and no overtaking is performed (S22). Here, in the path generation processing, a travel path causing the host vehicle to travel without overtaking the overtaking target vehicle is generated.

Figure 6:
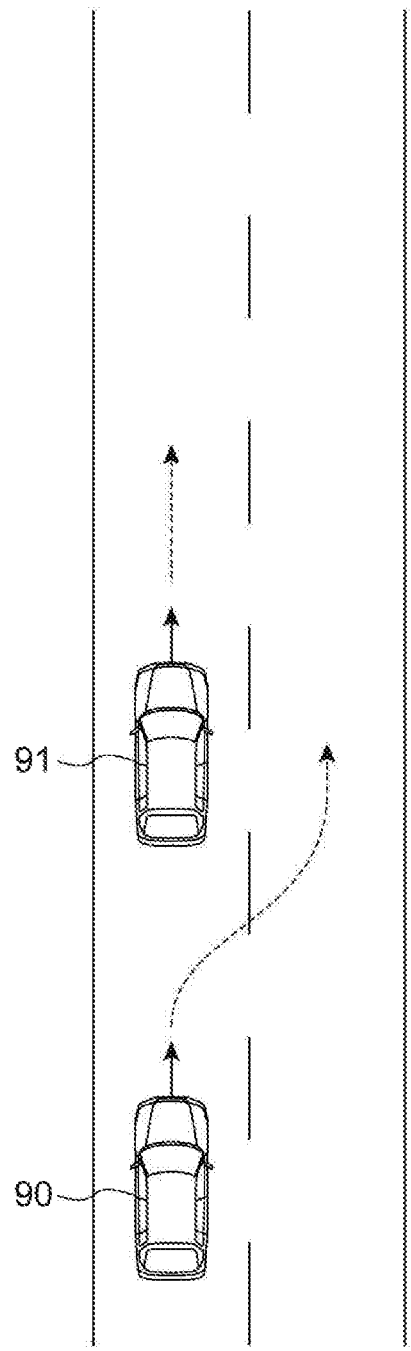
FIG. 6 is a diagram for describing path generation processing in the travel control apparatus in FIG. 1.

For example, as illustrated in FIG. 6, in a case where it is determined that the preceding vehicle 91 accelerates and a front vehicle is not present before the host vehicle 90 changes the lane from the position behind the preceding vehicle 91 which is the overtaking target vehicle, a path causing the host vehicle 90 travel while keeping the current lane is generated. In this case, it is estimated that the preceding vehicle 91 accelerates and does not decelerate thereafter, it is difficult for the host vehicle 90 to smoothly pass the preceding vehicle 91. For this reason, a travel path causing the host vehicle 90 to stop the overtaking travel and to travel in the same lane without changing the lane is generated. In this way, the safety in travelling of the host vehicle can be ensured. The host vehicle may be caused to travel so as to decelerate while stopping the overtaking travel.

Figure 7:
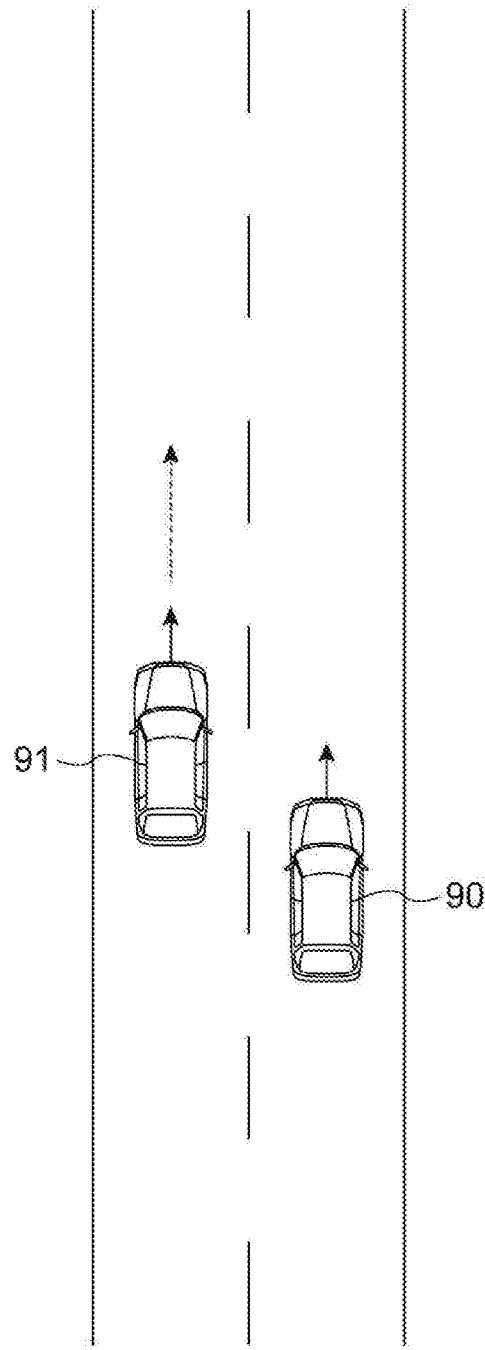
FIG. 7 is a diagram for describing path generation processing in the travel control apparatus in FIG. 1.

In addition, as illustrated in FIG. 7, in a case where it is determined that the preceding vehicle 91 accelerates and a front vehicle is not present after the host vehicle 90 changes the lane from the position behind the preceding vehicle 91, a travel path causing the host vehicle 90 to return to the original lane is generated or a path causing the host vehicle 90 to travel while keeping the current lane is generated. In this case, it is estimated that the preceding vehicle 91 accelerates and does not decelerate thereafter, it is difficult for the host vehicle 90 to smoothly pass the preceding vehicle 91. For this reason, a travel path causing the host vehicle 90 to stop the overtaking travel or to travel in the same lane without changing the lane is generated. In this way, the safety in travelling of the host vehicle can be ensured. In this case also, the host vehicle may be caused to travel so as to decelerate while stopping the overtaking travel.

On the other hand, in a case where it is determined in S18 in FIG. 2 that the front vehicle is present in front of the overtaking target vehicle, it is estimated whether or not the overtaking target vehicle decelerates due to the presence of the front vehicle (S20). This estimation processing is processing for estimating whether or not the overtaking target vehicle decelerates by catching up with the front vehicle. For example, it is determined whether or not the overtaking target vehicle catches up with the front vehicle and decelerates within a predetermined time. Specifically, as illustrated in FIG. 5, it is determined whether or not the preceding vehicle 91 which is the accelerated overtaking target vehicle catches up with the front vehicle 96 within a predetermined time. A time set in advance in the ECU 10 may be used as the predetermined time. In a case where the preceding vehicle 91 catches up with the front vehicle 96, it is determined that the preceding vehicle 91 decelerates, and in a case where the preceding vehicle 91 does not catch up with the front vehicle 96, it is determined that the preceding vehicle 91 does not decelerate. In addition, whether or not the preceding vehicle 91 decelerates which is the overtaking target vehicle decelerates due to the presence of the front vehicle 96 may be determined based on the relative distance and the relative speed between the host vehicle 90, the preceding vehicle 91, and the front vehicle 96.

In a case where it is determined in S20 that the overtaking target vehicle does not decelerate, the generation of the path is performed, in which the host vehicle stops the overtaking travel and no overtaking is performed (S22). Here, in the path generation processing, a travel path causing the host vehicle to travel without overtaking the overtaking target vehicle is generated.

Figure 8:
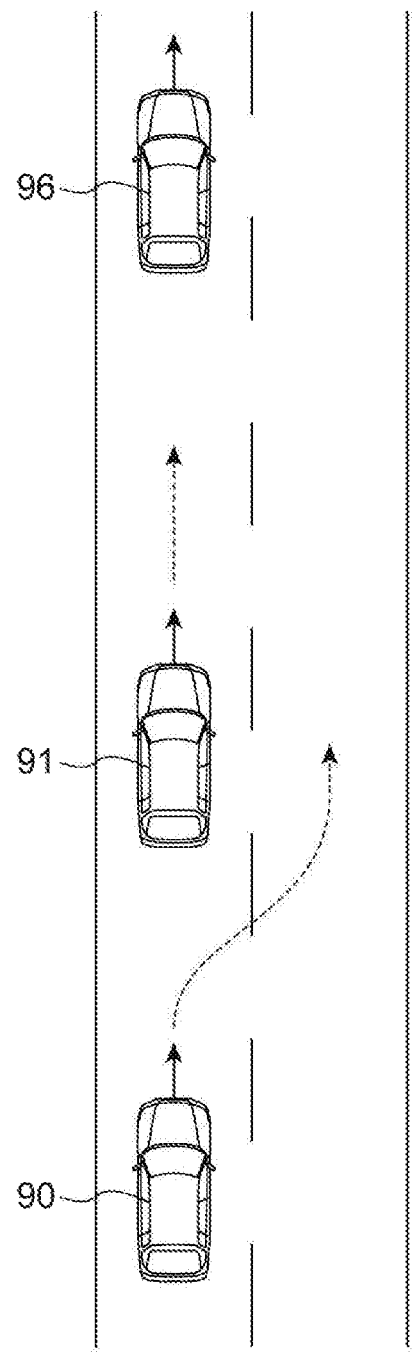
FIG. 8 is a diagram for describing path generation processing in the travel control apparatus in FIG. 1.

For example, as illustrated in FIG. 8, in a case where it is determined that the preceding vehicle 91 does not decelerate before the host vehicle 90 changes the lane from the position behind the preceding vehicle 91 which is the overtaking target vehicle, a path causing the host vehicle 90 travel while keeping the current lane is generated. In this case, it is determined that it is difficult for the host vehicle 90 to smoothly pass the preceding vehicle 91, a travel path causing the host vehicle 90 to stop the overtaking travel and to travel in the same lane without changing the lane is generated. In this way, the safety in travelling of the host vehicle can be ensured. The host vehicle may be caused to travel so as to decelerate while stopping the overtaking travel.

Figure 9:
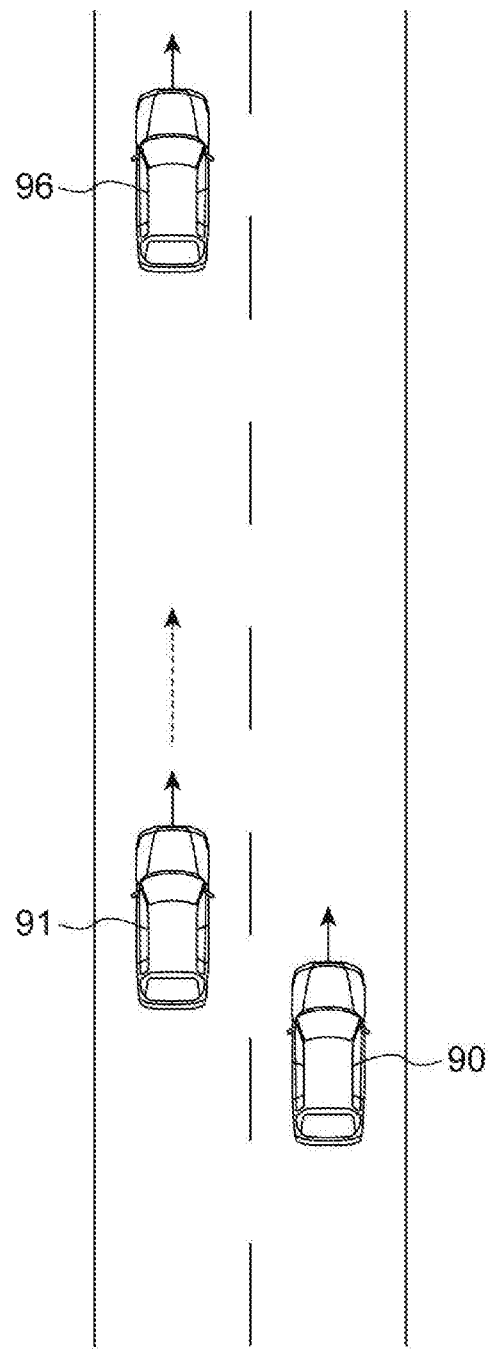
FIG. 9 is a diagram for describing path generation processing in the travel control apparatus in FIG. 1.

In addition, as illustrated in FIG. 9, in a case where it is determined that the preceding vehicle 91 does not decelerate after the host vehicle 90 changes the lane from the position behind the preceding vehicle 91 which is the overtaking target vehicle, a path causing the host vehicle 90 to return to the original lane is generated or a path causing the host vehicle 90 to travel while keeping the current lane is generated. In this case, it is determined that it is difficult for the host vehicle 90 to smoothly pass the preceding vehicle 91, a travel path causing the host vehicle 90 to stop the overtaking travel or to travel in the same lane without changing the lane is generated. In this way, the safety in travelling of the host vehicle can be ensured. In this case also, the host vehicle may be caused to travel so as to decelerate while stopping the overtaking travel.

Incidentally, it is determined in S20 in FIG. 2 that the overtaking target vehicle decelerates, the second overtaking path is generated (S26). This second overtaking path generation processing is processing of generating an overtaking path with changing the overtaking target vehicle, and a processing of generating a travel path in which the host vehicle passes a changed new overtaking target vehicle after the changing the lane, and then, returns to the original lane in front of the new overtaking target vehicle. In this case, the overtaking target vehicle is changed from the preceding vehicle immediately in front of the host vehicle to a front vehicle travelling in front of the preceding vehicle. That is, the second overtaking path is a travel path for the host vehicle to overtake both the preceding vehicle and the front vehicle at once.

Figure 10:
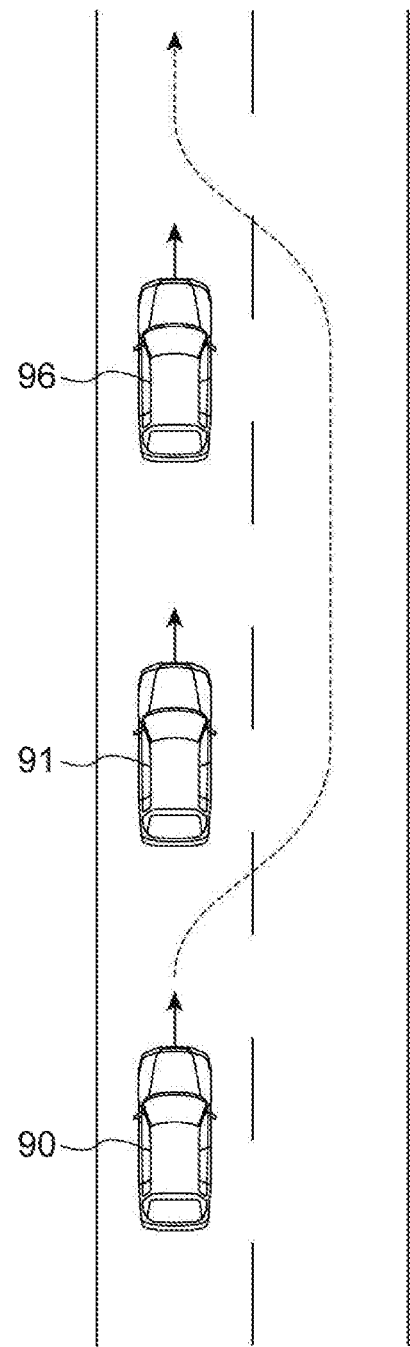
FIG. 10 is a diagram for describing path generation processing in the travel control apparatus in FIG. 1.

For example, as illustrated in FIG. 10, in a case where it is determined that the preceding vehicle 91 decelerates before the host vehicle 90 changes the lane from the position behind the preceding vehicle 91, a travel path is generated, in which the overtaking target vehicle is changed from the preceding vehicle 91 to the front vehicle 96, the host vehicle 90 changes the lane and passes the preceding vehicle 91 and the front vehicle 96, and then, changes the lane to toward the original lane at in front of the front vehicle 96 which is the overtaking target vehicle. In this way, even in a case where the preceding vehicle 91 accelerates during the overtaking travel of the host vehicle 90, it is possible to smoothly perform the overtaking travel according to the travelling situation of the surrounding vehicles. Therefore, it is possible to suppress the travel time for the host vehicle 90 to the destination from becoming long.

Figure 11:
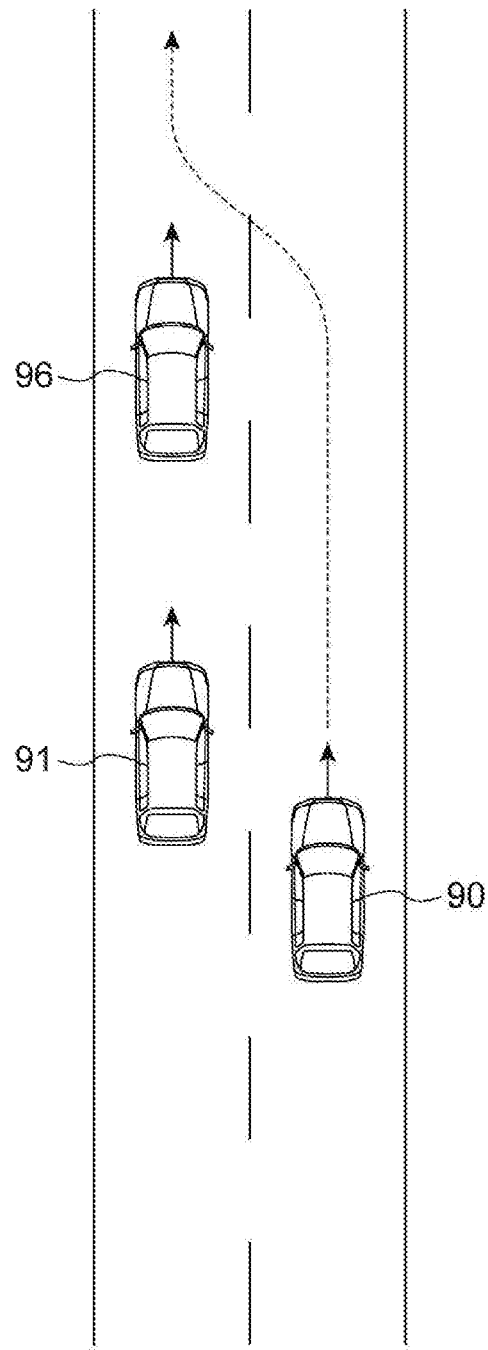
FIG. 11 is a diagram for describing path generation processing in the travel control apparatus in FIG. 1.

In addition, as illustrated in FIG. 11, in a case where it is determined that the preceding vehicle 91 decelerates before the host vehicle 90 changes the lane from the position behind the preceding vehicle 91, a travel path is generated, in which the overtaking target vehicle is changed from the preceding vehicle 91 to the front vehicle 96, the host vehicle 90 passes the preceding vehicle 91 and the front vehicle 96, and then, changes the lane to toward the original lane at in front of the front vehicle 96 which is the overtaking target vehicle. In this way, even, in a case where the preceding vehicle 91 accelerates during the overtaking travel of the host vehicle 90, it is possible to smoothly perform the overtaking travel according to the travelling situation of the surrounding vehicles. Therefore, it is possible to suppress the travel time for the host vehicle 90 to the destination from becoming long.

Then, the process proceeds to S28 in FIG. 2 and the travel control processing is performed. The travel control processing is processing for performing the travel control of the host vehicle according to the generated travel path. The travel control of the host vehicle is performed by the control signal being output from the ECU 10 to the actuator S and the operation of the actuator 8 such that the host vehicle travels along the travel path. When the travel control processing in S28 ends, a series of control processing ends.

In the travel control processing in FIG. 2, execution of a part of the control processing may be omitted, an order of the control processing may be changed, or another control processing may be added as long as the result of control is not affected.

In the travel control processing in FIG. 2 described above, the acceleration determination of the overtaking target vehicle in S16 is performed based on the travelling state of the actual overtaking target vehicle. However, it may be estimated whether or not the overtaking target vehicle accelerates based on a past travelling history or the like of the overtaking target vehicle.

As described above, according to the travel control apparatus 1 in the present embodiment, in a case where the overtaking target vehicle accelerates and the front vehicle is not present during the overtaking travel of the host vehicle, and even when the front vehicle is present, in a case where the overtaking target vehicle does not decelerate, the overtaking travel of the host vehicle stops. In this wan it is possible to ensure the safety in travelling of the vehicle. On the other hand, even when the overtaking target vehicle accelerates during the overtaking travel of the host vehicle, in a case where the overtaking target vehicle decelerates due to the presence of the front vehicle, the host vehicle continues the overtaking travel. In this way, it is possible to appropriately perform the overtaking travel according to the travelling state of the surrounding vehicles. In addition, it is possible to suppress the travelling time required for the host vehicle to travel to the destination from becoming long.

The embodiment described above one embodiment of the travel control apparatus according to the present invention, and the travel control apparatus according to the present invention is not limited to the apparatus in the embodiment described above. The travel control apparatus according to the present invention may be an apparatus in which the travel control apparatus in the embodiment described above is modified without changing the spirit described in each of the aspects, or may be an apparatus which is applied to others.

For example, in the travel control processing in FIG. 2 in the embodiment described above, the deceleration determination in S20 may be omitted. That is, in a case where it is determined that the front vehicle is present in front of the overtaking target vehicle in S18, the generation of the second overtaking path in S26 may be performed. In the travel control processing like this, in a case where the overtaking target vehicle accelerates during the overtaking travel of the host vehicle, when the front vehicle is not present, the overtaking travel of the host vehicle stops. In this way, in a case where there is a concern that overtaking the overtaking target vehicle cannot be smoothly performed, the overtaking travel stops. Therefore, it is possible to ensure the safety of the vehicle travel. On the other hand, even when the overtaking target vehicle accelerates during the overtaking travel of the host vehicle, in a case where the front vehicle is present, the overtaking travel of the host vehicle continues. In this way, in a case where there is a possibility that the accelerated overtaking target vehicle decelerates after the acceleration, the overtaking travel can be continued and thus, it is possible to perform the appropriate overtaking travel in accordance with the travelling state of the surrounding vehicles.

Figure 12:
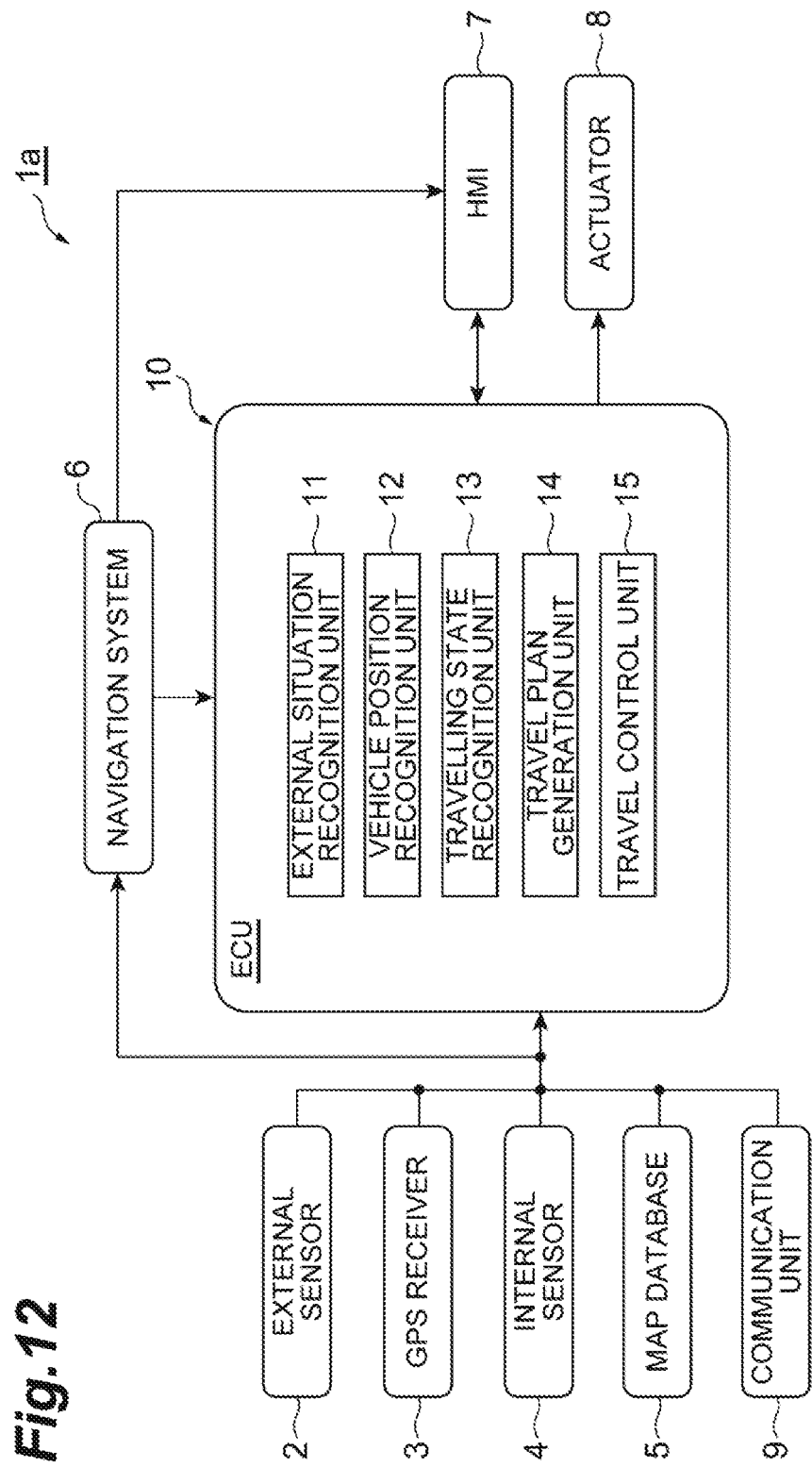
FIG. 12 is a diagram illustrating a configuration overview of a modification example of the travel control apparatus in FIG. 1.

In addition, in the travel control apparatus 1 in the embodiment described above, the travelling state information of the vehicles surrounding the host vehicle is acquired from the external sensor 2, but the information may be acquired from another apparatus, facility, or the like. As illustrated in FIG. 12, a communication unit 9 which is capable of communicating with another vehicle or a facility on the road is provided, and the travel control apparatus may acquire and use the travelling state information of the surrounding vehicles obtained by a vehicle-to-vehicle communication with the other vehicle or a road-to-vehicle communication with the facility on the road. In this case, the communication unit 9 may be a unit that acquires and uses the operation state information including the acceleration operation of the driver of the overtaking target vehicle.

What is claimed is:

1. A travel control apparatus configured to perform an overtaking travel on a host vehicle with a vehicle travelling ahead as an overtaking target vehicle during autonomous driving of the host vehicle, the apparatus comprising:
   a travelling state acquisition unit configured to acquire travelling state information of vehicles surrounding the host vehicle;
   an acceleration determination unit configured to determine whether or not the overtaking target vehicle accelerates at equal to or greater than a threshold value during the overtaking travel of the host vehicle based on the travelling state information;
   a front vehicle determination unit configured to determine where or not a front vehicle travelling in front of the overtaking target vehicle is present based on the travelling state information in a case where the acceleration determination unit determines that the overtaking target vehicle accelerates at equal to or greater than the threshold value during the overtaking travel of the host vehicle; and
   a travel control unit configured to stop the overtaking travel of the host vehicle in a case where the front vehicle determination unit determines that the front vehicle is not present, and to continue the overtaking travel or the host vehicle in a case where the front vehicle determination unit determines that the front vehicle is present.

2. The travel control apparatus according to claim 1 further comprising:
   an estimation unit configured to estimate whether or not the overtaking target vehicle decelerates due to the presence of the front vehicle in a case where the front vehicle determination unit determines that the front vehicle travelling in front of the overtaking target vehicle is present,
   wherein, in a case where the estimation unit estimates that the overtaking target vehicle does not decelerate, the travel control unit is configured to stop the overtaking travel of the host vehicle, and in a case where the estimation unit estimates that the overtaking target vehicle decelerates, the travel control unit is configured to continue the overtaking travel of the host vehicle.

* * * * *